G. F. J. Colburn,
Hinge.
N° 43,670.  Patented Aug. 2, 1864.

Witnesses:
J. P. Hall
Wm. F. McNamara

Inventor:
G. F. J. Colburn

UNITED STATES PATENT OFFICE.

G. F. J. COLBURN, OF NEWARK, NEW JERSEY.

IMPROVED BUTT-HINGE.

Specification forming part of Letters Patent No. 43,670, dated August 2, 1864.

*To all whom it may concern:*

Be it known that I, G. F. J. COLBURN, of Newark, in the county of Essex and State of New Jersey, have invented a new and useful Improvement in Butt-Hinges; and I do hereby declare that the following is a full, clear, and exact description thereof, which will enable others skilled in the art to make and use the same, reference being had to the accompanying drawings, making a part of this specification, in which—

Figure 1:
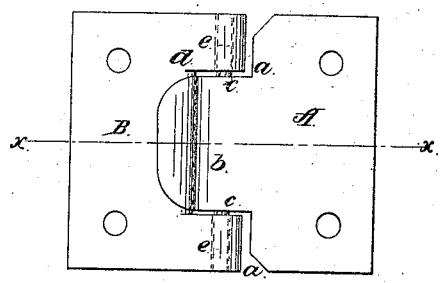
Figure 2:
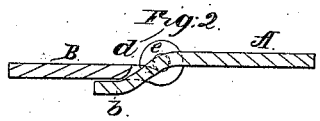
Figure 3:
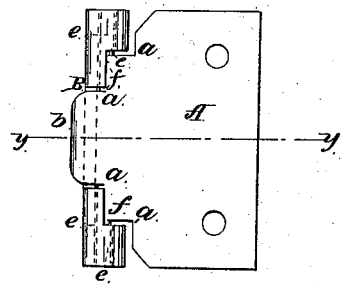
Figure 4:
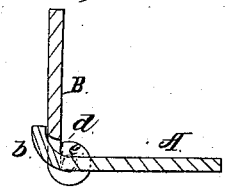

Figure 1 is a view of my invention in an open state; Fig. 2, a section of the same, taken in the line *x x*, Fig. 1; Fig. 3, a view of a modification of the same in an open state; Fig. 4, a section of Fig. 3, taken in the line *y y*.

Similar letters of reference indicate like parts.

This invention has for its object the making of a butt-hinge, provided with pintles, out of two pieces of metal only, in such a manner that the hinge may, with the same machinery used in its construction, be provided with a stop to admit of the hinge opening to any desired angle.

A, Figs. 1 and 2, represents one part or leaf of the hinge, the main portion of which may be of the usual form, but at its inner edge it is notched out at each side, as shown at *a a*, so as to form what may be termed a "lip," *b*, and two pintles, *c c*, which project at right angles from each side of the lip, rather back of its center, and in line with each other, as shown clearly in Fig. 1. This leaf A may be swaged or cut at one operation out of a piece of sheet metal. The outer leaf, B, has a rectangular recess, *d*, in its inner edge, of a width sufficient to receive the lip *b* of plate A, said recess being sufficiently deep to admit of the inner edge of the leaf B, at each side of the recess *d*, being bent or curved to form eyes or bearings *e e* to receive the pintles *c c* of the leaf A. In this mode of construction it will be seen that the lip *b* serves as a stop and prevents the leaves A B being turned beyond a point in which the leaves will be in or about in the same plane, (see Fig. 2;) but by curving or bending the lip *b* at right angles with leaf A, as shown in Fig. 4, the leaves when opened will be prevented from assuming relatively with each other a greater angle than a right angle; but this, it will be seen, may be varied as desired by bending the lip *b* to different angles relatively with the leaf A. In this latter modification I propose to have the leaf A formed with two notches, *a a*, at each side of the lip *b*, and the eyes or bearings *e e*, each notched out, as shown at *f f*, Fig. 3, to form a double stop or bearing, insuring greater strength by preventing the contingency of the bending of the lip *b*. Thus it will be seen that I obtain a butt-hinge constructed out of two pieces only and provided with pintles and a stop, the latter being capable of being bent or adjusted to admit of the leaves opening to any desired angle.

I do not wish to confine myself strictly to the form or construction of the hinge shown in the drawings, as hinges may, without alteration of the principle herein set forth, be constructed or formed somewhat differently—as, for instance, the stop may not be confined to the center of the butt or the pintle at the ends, but the stop may be at the ends and the pintle in the center should such modification be required.

I claim as new and desire to secure by Letters Patent—

A butt-hinge constructed out of two parts, and provided with pintles, and a stop, substantially as herein shown and described.

G. F. J. COLBURN.

Witnesses:
J. P. HALL,
WM. F McNAMARA.